United States Patent [19]

Richards

[11] Patent Number: 6,125,504
[45] Date of Patent: Oct. 3, 2000

[54] CHAIR CASTER COVER

[76] Inventor: Tammy L. Richards, 2504 Piedra Dr., Plano, Tex. 75923

[21] Appl. No.: 09/157,799

[22] Filed: Sep. 21, 1998

[51] Int. Cl.[7] .................................................. B60B 33/00
[52] U.S. Cl. ........................................................ 16/18 CG
[58] Field of Search ........................................... 16/18 CG

[56] References Cited

U.S. PATENT DOCUMENTS

| | | | |
|---|---|---|---|
| 24,294 | 6/1859 | Gelin | 16/18 CG |
| 2,471,958 | 5/1949 | Humphreys | 16/18 CG |
| 2,533,403 | 12/1950 | Schultz | 16/18 CG |
| 2,613,389 | 10/1952 | Cramer | 16/18 CG |
| 2,981,969 | 5/1961 | Fontana | 16/18 CG |
| 3,345,675 | 10/1967 | Haydock | 16/18 CG |
| 4,457,045 | 7/1984 | Kegg | 16/18 CG |
| 5,062,665 | 11/1991 | Schotthoefer | 280/770 |
| 5,134,753 | 8/1992 | Rekuc | 16/18 CG |
| 5,873,144 | 2/1999 | Tupper et al. | 16/18 CG |
| 5,893,459 | 4/1999 | Croft | 206/460 |
| 5,924,165 | 7/1999 | Gierer et al. | 16/18 CG |
| 5,965,078 | 10/1999 | Bolanos et al. | 264/272.17 |

*Primary Examiner*—Anthony Knight
*Assistant Examiner*—Vishal Patel
*Attorney, Agent, or Firm*—John E. Vandigriff

[57] ABSTRACT

A universal caster cover that can be used with just about any caster used on furniture such as chairs and tables is made of a flexible material, such as plastic. The cover has an end that may be opened to place the cover around a caster, and then sealed to close the opening. An adhesive tape is mounted on the inside top of the cover and is used to attached the cover to a non-rolling part of the caster. The cover protects objects such as a person's shoes or furniture from being damaged when the cover engages the shoe or furniture when the chair or other object on casters is moved.

12 Claims, 4 Drawing Sheets

CHAIR CASTER COVER

FIELD OF THE INVENTION

The invention relates chair casters, and more particularly to a protective flexible cover for a caster.

BACKGROUND OF THE INVENTION

Office workers sitting at a desk or computer are often moving the chair on which they are sitting to move from the desk or to move to another position. Office chairs used at desks and computer stations usually have rollers or casters to permit ease in moving the chair to another position, or to and away from the desk or work station. Often the chair caster will move against the person's shoes scratching or otherwise damaging the shoe surface. Consideration has been given to this problem. For example, U.S. Pat. No. 2,059,348, shows the use of a caster cover or guard which encloses the edges of the caster horn or mount. The guard is permanently mounted on the chair leg.

U.S. Pat. No. 5,123,143, describes a flexible caster cover that is placed over the caster and around the shaft on which the caster is mounted. The caster cover is of a flexible material in the shape of a cylinder with one side open along its length through which the caster extends. The cylinder is open on each end.

U.S. Pat. No. 5,371,920, defines a caster guard that is a two piece guard that is assembled around a caster. The guard has a flared bottom edge that is used to sweep away objects that are in the path of a rolling caster.

SUMMARY OF THE INVENTION

The invention is a universal caster cover that can be used with just about any caster used on furniture such as chairs and tables. The caster cover is made of a flexible material, such as plastic. The cover has an end that may be opened to place the cover around a caster, and then sealed to close the opening. An adhesive tape is mounted on the inside top of the cover and is used to attach the cover to a non-rolling part of the caster. The cover protects objects such as a person's shoes or furniture from being damaged when the cover engages the shoe or furniture when the chair or other object on casters is moved.

DESCRIPTION OF A PREFERRED EMBODIMENT

Figure 1:
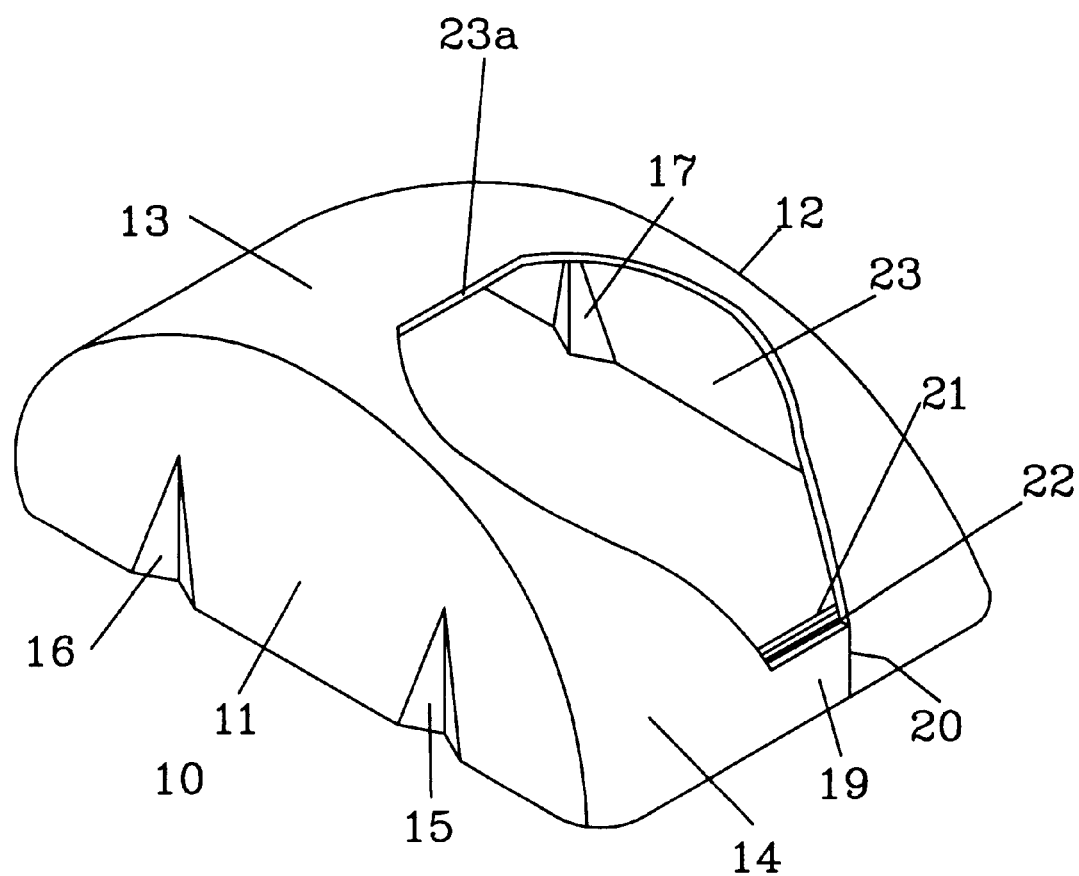
FIG. 1 is an isometric view of the cover of the invention.

FIG. 1 shows an isometric view of the caster cover of the invention. Cover 10 has two sides 11 and 12 which taper from a center top to two ends. Each side has two triangular insets 15 and 16 for side 11, and 17 and 18 (FIG. 3) for side 12. Triangular insets 15–18 add strength to the sides 11 and 12 so that they will not bow outward or inward. The top part is made up of two sloping surfaces 13 and 14. Surface 13 is solid with no opening while surface 14 has an opening 23 which is used to allow the insertion of a caster into cover 10. Side 14 has a tab 19, with end 20, which can be bent away from an inner tab 21 allowing cover 10 to be positioned around a caster. A two sided adhesive tape 22 is used to hold tabs 19 and 21 together after cover 10 has been placed around a caster.

Figure 2:
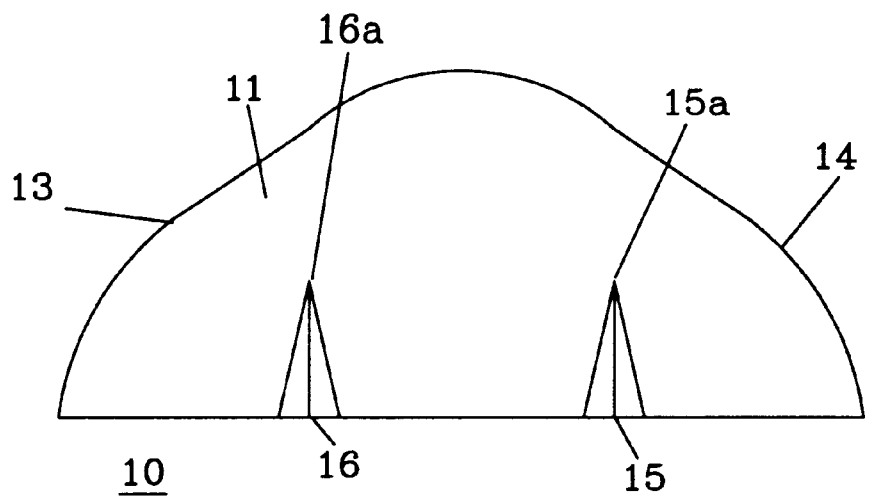
FIG. 2 is a side view of the caster cover.

FIG. 2 is a side view of cover 10 showing side 11 and an edge view of the sloping surfaces. Side 11, as well as side 12 (FIGS. 3 and 4) has triangular insets 15 and 16 which are spaced apart on sides 11 and 12, and extend upward tapering to a point, for example, points 15a and 16a on side 11. Triangular insets add strength to each of sides 11 and 12.

Figure 3:
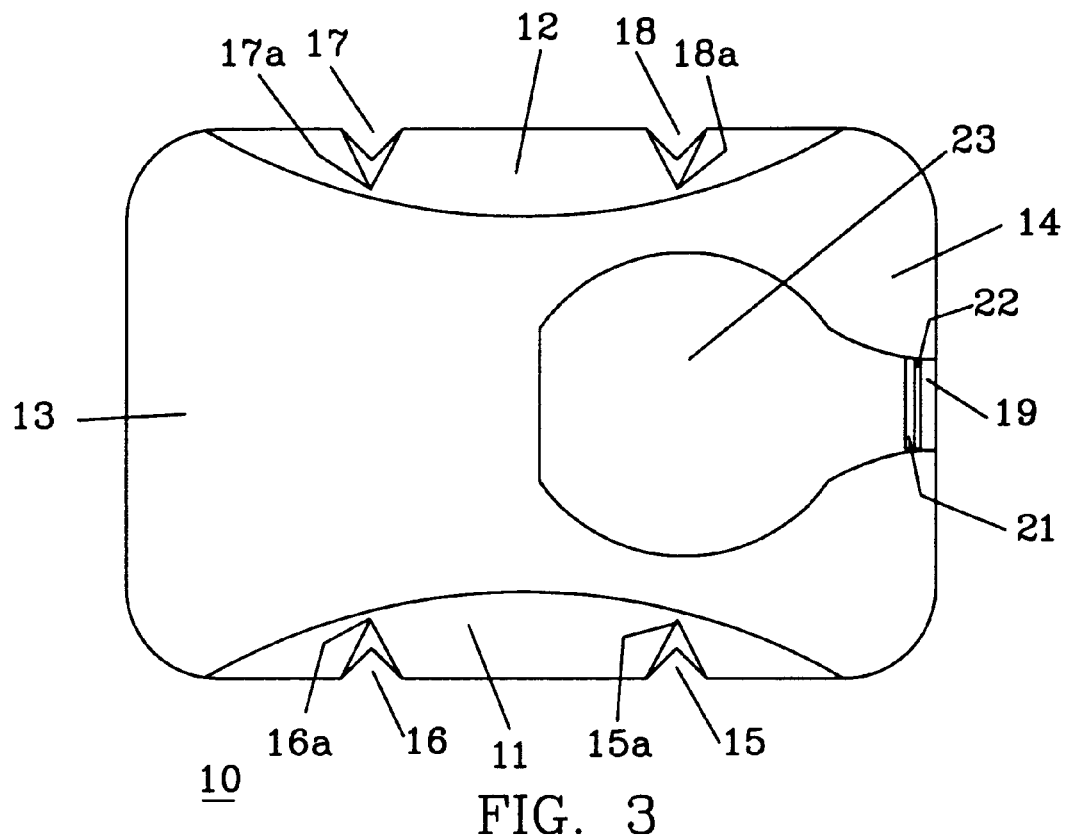
FIG. 3 is a top view of the caster cover.

FIG. 3 is a top view of cover 10 showing that its general shape is rectangular with rounded corners, in this view, and that sides 11 and 12 slope slightly inward. Triangular insets 15–18 are shown with insets 15a–18a along the base perimeter of cover 10. An opening 23 is shown in sloped surface 14 which allows a wheel leg (not shown) to extend upward from the caster and out of cover 10. The size of opening 23 is not critical, but only has to be large enough to allow various chair leg sizes to be accommodated. Tab 19 is then sealed against inner tab 21 with two sided tape 22. Tabs 19 and 21 are sealed together only after cover 10 has been positioned around a caster.

Figure 4:
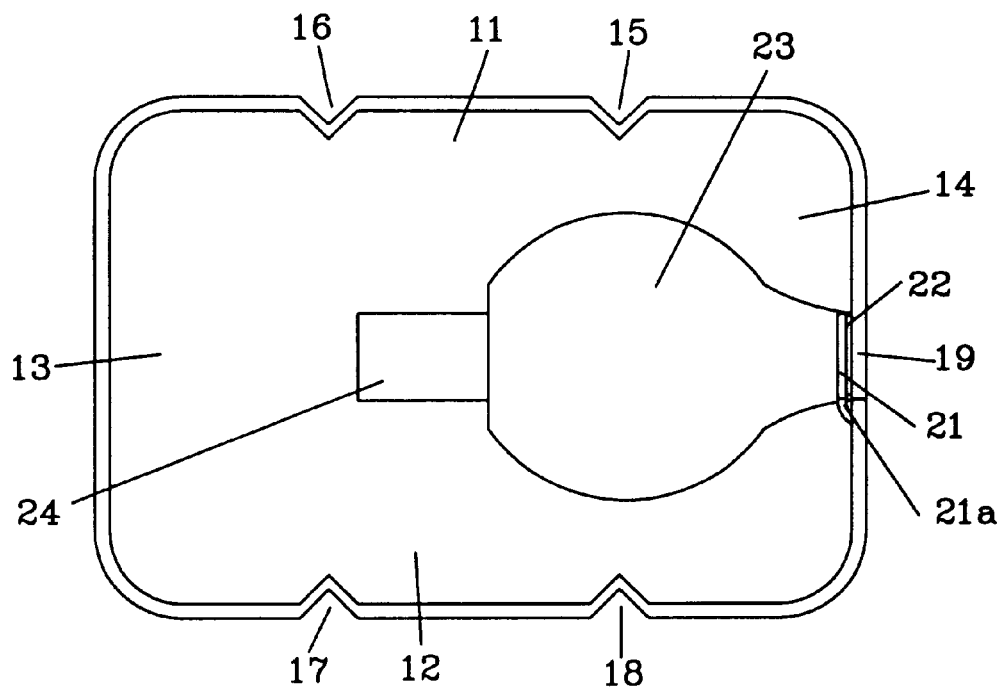
FIG. 4 is a bottom view of the caster cover.

FIG. 4 is a bottom view showing the inside of the cover 10. The bottom edge is outlined showing the insets 15–18 in sides 11 and 12. A double sided strip of tape 24 is shown on the inside top portion of face 13, adjacent to opening 23. Tape 24 is used to attached cover 10 to a caster support frame. Tab 21 is shown adjacent to tape 22 and tab 19, and is shown to be attached at 21a to the inside face 14 of cover 10.

Figure 5:
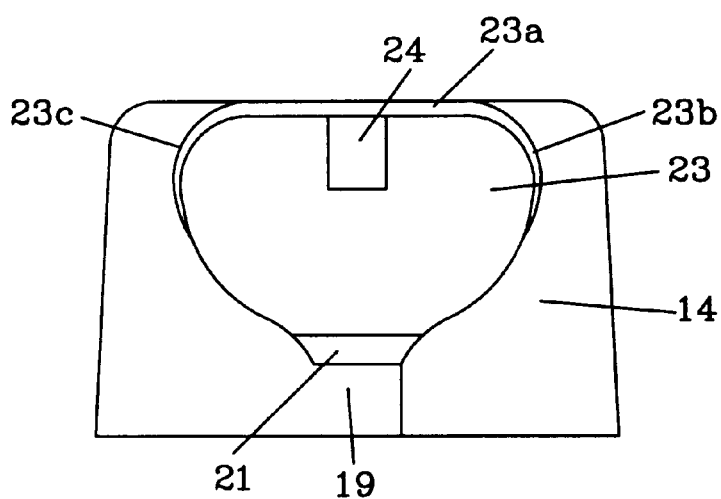
FIG. 5 is a end view of the caster cover.

An end view of cover 10 is shown in FIG. 5, from the view point of face 14. Opening 23 is shown to extend down to tab 21, to which tab 19 is attached to hold cover 10 together after cover 10 has been place around a caster. Attachment tape 24 is shown through opening 23.

Figure 6:
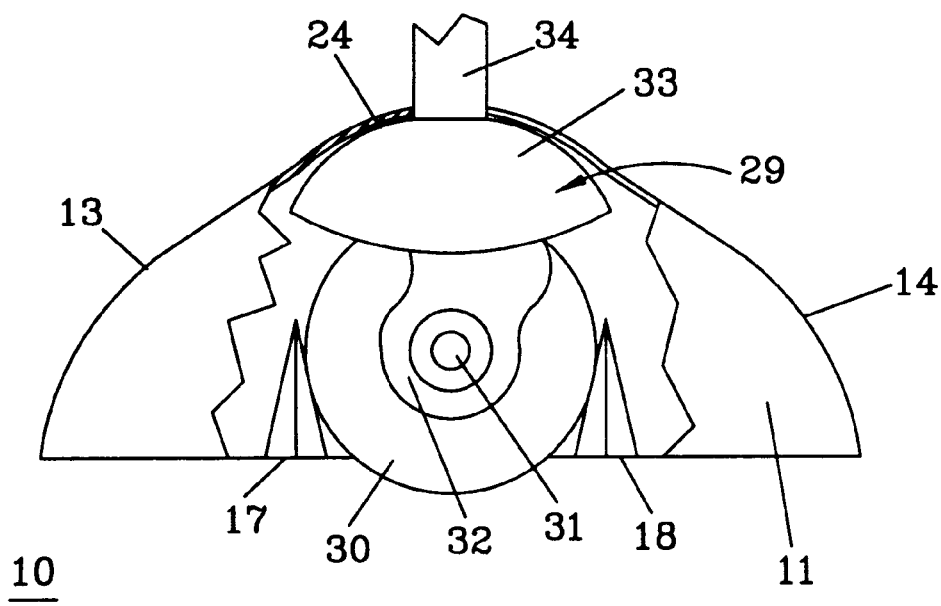
FIG. 6 is a cut-away side view showing a caster in the caster cover.

An example showing the use of cover 10 is illustrated in FIG. 6. In FIG. 6, a caster 29 having a wheel 30 mounted on support 32 by axle pin 31, and having a wheel cover 33 is mounted inside cover 10 by tape 24. Tabs 19 and 21 FIG. 5, are bent outward and inward, respectively, to allow support shaft 34 to pass through an opening in surface 14. After caster 29 has been inserted into cover 10, a surface covering (not illustrated) of tape 24 is removed and tape 24 is adhered to caster cover 33. Tab 19 is adhered to tab 21 by tape 22 (FIG. 4). Opening 23 has rounded sides 23b and 23c, adjacent to flat side 23a (FIG. 5) to allow large round support shafts. Support shaft 34 is shown small in FIG. 6, but because of the size and shape of opening 23, just about any type of support shaft can be accommodated.

Figure 7:
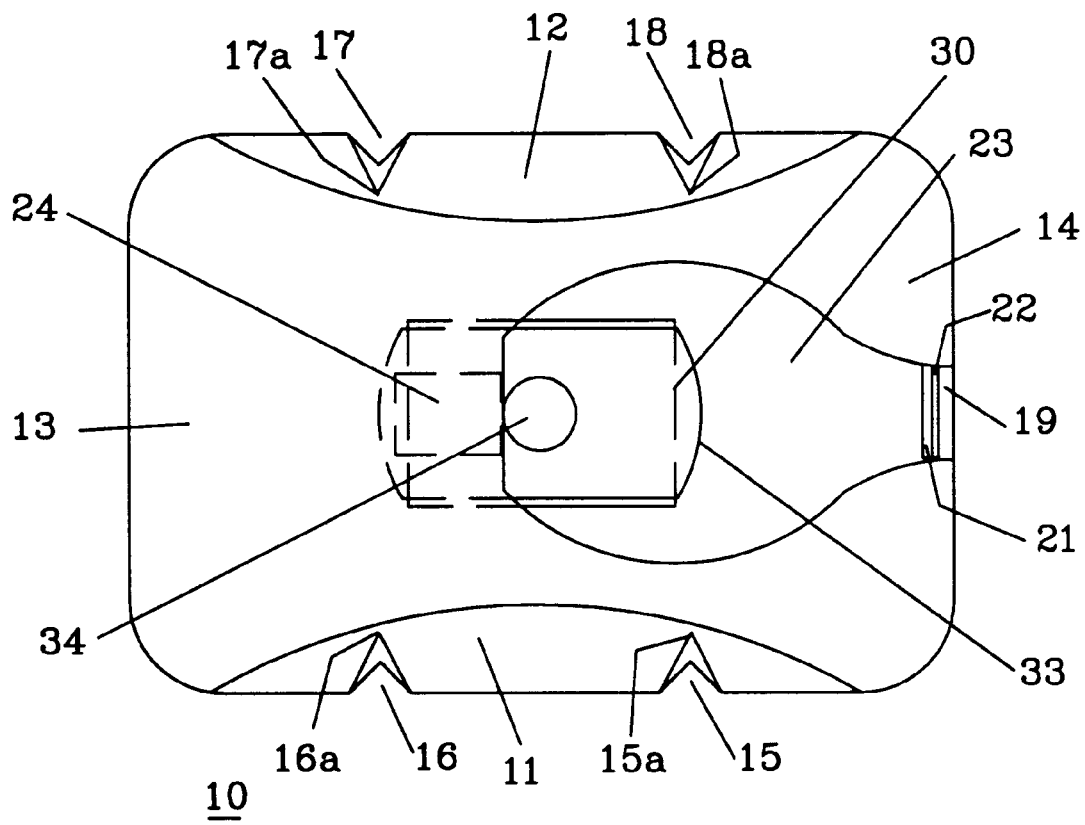
FIG. 7 is a top view of the cover mounted on a caster.

FIG. 7 shows cover 10 mounted on caster 29. Wheel 30 and tape 24 are shown in dashed lines, and caster cover 33 is showin in opening 23, and under cover 10 in dashed lines.

A feature of wheel cover 10 is the tapering of opening 23 to tab 19. This allows for support of narrow caster wheels. When Caster cover 33 is narrow, the tapering of rounded sides 23b and 23c toward 23a will help cover 10 from sagging or drooping downward around cover 33.

Cover 10 is, for example, molded of a flexible plastic material so that when it is over a caster, and the cover is moved against an object of furniture or a person's shoe, cover 10 will flex and not damage the object which it engages. The flexible cover can warn a person, on contact, for example with a shoe, that the caster is near the shoe. The flexing of the cover on contact with an object presents an early warning so that movement of the chair or table on the caster can be stopped before the flexible cover is flexed against the caster. Cover 10 is designed such that it can be placed around most casters providing a universal caster cover that will prevent damage, from all sides of the caster, to an object when the caster is rolled against the object. The straight end 23a of opening 23 (FIG. 1) helps position the cover on, for example, chair legs that are square or rectangular.

What is claimed is:

1. A caster cover for preventing a caster from engaging and damaging an object, comprising;

a flexible body having a pair of opposite sides and a pair of sloped surfaces, an opening in one of said sloped surfaces through which a caster support extends;

a pair of first and second tabs closing one end of said opening, said tabs being moveable to allow insertion of a caster into said cover.

2. A caster cover according to claim 1, including a strip of two sided adhesive tape on one of said sloped surfaces for securing the cover to a caster.

3. A caster cover according to claim 1, wherein said opposite sides are adjacent to said pair of slope top surfaces, said two opposite sides having reinforcing indentations therein.

4. A caster cover according to claim 1, including a doubled sided tape in between said pair of tabs to seal the tabs together after a caster has been inserted into said caster cover.

5. A caster cover according to claim 1, wherein said first tab is attached to and is a part of one of said sloped surfaces.

6. A caster cover according to claim 1, wherein said second tab is connected to an inside surface of a slope surface.

7. A caster cover for preventing a caster from engaging and damaging an object, comprising;

a flexible body having a top surface sloping to first and second ends, and two sides;

an opening in the top surface of the body through which a caster support extends;

a pair of first and second tabs closing one of said first and second ends and one end of said opening in the top surface, said tabs being moveable to allow insertion of a caster between said tabs into said cover.

8. A caster cover according to claim 7, including a strip of two sided adhesive tape on an inside surface of said top surface for securing the cover to a caster.

9. A caster cover according to claim 7, wherein the two sides are adjacent to the top surface, said two sides having triangular indentations therein.

10. A caster cover according to claim 7, including a doubled sided tape in between said pair of tabs to seal the tabs together after a caster has been inserted into said caster cover.

11. A caster cover according to claim 7, wherein said top surface includes two sloped surfaces said first tab is attached to and a part of one of said sloped surfaces.

12. A caster cover according to claim 7, wherein said second tab is connected to an inside surface of said flexible body.

* * * * *